United States Patent
Wimmer

(10) Patent No.: US 6,474,977 B1
(45) Date of Patent: Nov. 5, 2002

(54) MOLD FOR INJECTION MOLDING AND DIECASTING MACHINES

(76) Inventor: Erwin Wimmer, Thurnsdorf 3, A-4300 St. Valentin (AT)

( * ) Notice: Subject to any disclaimer, the term of this patent is extended or adjusted under 35 U.S.C. 154(b) by 159 days.

(21) Appl. No.: 09/642,490

(22) Filed: Aug. 18, 2000

(30) Foreign Application Priority Data

Aug. 20, 1999 (AT) ............................................. 1436/99

(51) Int. Cl.[7] .............................................. B29C 45/44
(52) U.S. Cl. ................. 425/556; 425/577; 425/DIG. 58
(58) Field of Search ................................ 425/556, 577, 425/DIG. 58

(56) References Cited

U.S. PATENT DOCUMENTS 6,039,558 A * 3/2000 Park et al. ................... 425/556

* cited by examiner

*Primary Examiner*—Tim Heitbrink
(74) *Attorney, Agent, or Firm*—Collard & Roe, P.C.

(57) ABSTRACT

A mold for injection molding or diecasting machines, which comprises two closable mold parts defining a die cavity therebetween in a closed position of the mold parts, and inserts slidably movable in rectilinear guides in respective ones of the mold parts. The guides leading into the die cavity have a taper narrowing in a closing direction of the mold parts, and the inserts have guide surfaces Inning at a slant to the taper of the guides.

5 Claims, 4 Drawing Sheets

MOLD FOR INJECTION MOLDING AND DIECASTING MACHINES

FIELD OF THE INVENTION

The invention relates to a mold for injection molding and diecasting machines with two closable mold parts, which form between them a die cavity, probably using mold mandrels and/or mold slides, and of which one mold half accommodates at least one ejector, with the ejector, the mandrel and the slide being seated slidable as movable inserts in straight-line guides of the mold parts.

DESCRIPTION OF THE PRIOR ART

To be able to manufacture and subsequently eject subjects with hollows or undercuts by means of injection and diecast molding, mandrels, slides and ejectors are required, which must be inserted relatively displaceable in the mold parts. To this, there have as yet been straight-line guides with slide faces parallel to the guide direction in the mold parts and guide surfaces of the inserts also parallel to the guide direction, with straight-line guides and guide surfaces usually manufactured with a clearance fit (H7/g6). Due to the clearance-oriented manufacture there has in fact been a guide clearance between the respective maximum and minimum clearance, permitting a slidability of the parts, and intended to ensure the development of a sufficient lubrication film during mold operation and to prevent the penetration of the hot liquid melting during injection molding. In practice, these parallel slide systems are subjected to considerable wear, thus endangering the functional safety of the guides, leading to a deterioration in quality of the subjects due to the development of fins, requiring regular maintenance and lubrication cycles and resulting in a frequent exchange of the precise and expensive guide parts or the exchange of the whole mold after a relatively short service life. Particularly in case of non-lubricated operation of the guide systems, as it is frequently demanded in medical technology, in the electronic industries or in the automotive industries, there is an increase in wear, which leads to production losses and expensive repairs in the area of the mold.

SUMMARY OF THE INVENTION

It is therefore the objective of the invention to create a mold of the above mentioned type characterised by particularly long wearing and yet trouble-free guiding devices, which is also extremely suitable for operation without lubricants.

The objective of the invention is achieved in that the straight-line guides leading into the die cavity are provided with a taper narrowing in closing direction, preferably with a taper angle of 1° at maximum, and in that the guide surfaces of the inserts assigned to the straight-line guides run at a slant relative to the guide direction that is matched with this taper. Due to this slight taper the straight-line guide proper is not adversely affected, but the result are, on the one hand, extremely small guide gaps in closed position, which are, on the other hand, quickly widening as soon as the closed position is left. Therefore, opening and the closing are effected at a comparably large guide gap, usually up to 0.3 mm in width, leading to a low-contact and low-strain relative movement between the guide and the guide surface, thereby largely eliminating wear. Thus, of course, wear in the guide area of the inserts can be minimised, too, and a controlled sealing against the die cavity over the whole servcie life of the mold is ensured. Moreover, due to the increased gap width during closing and opening, the omission of lubricants becomes less problematic and the requirements to surface roughness and surface hardness become less stringent, which helps to simplify the very expensive working sequence when manufacturing the parts of the guide system.

It is particulary favorable, when, in closed position, there is a residual gap, predetermined by a mechanical stop, between the straight-line guides and the guide surfaces, preferably in the width range of 0.005 to 0.020 mm. By means of this residual gap it can be avoided that the inserts in the straight-line guides get jammed due to expansion or wedged due the closing forces, without the residual gap opening evident leaks to the die cavity, thus affecting the quality of the subjects due to the formation of fins. In spite of these minimum residual gaps, however, the inserts remain smooth-running and extremely long wearing due to the taper of the guides and the guide gap widening immediately together with the opening movement.

To be able to take up the very high closing forces without the danger of damage even in case of small mandrels, an additional straight-line guide separated from the die cavity is assigned as a secondary guide to the straight-line guide leading into the die cavity as the primary guide, with this latter having a greater taper angle compared with the seconary guide. This bigger and more rigid secondary guide is able to endure the accordingly high strains of the closing unit of the injection molding or diecasting machine and protects the more delicate primary guide from excessive strain. The taper angle of the pimary guide is at least 0.01° greater than the taper angle of the secondary guide, to ensure that in none of the possible sliding positions damaging or wearing forces are transmitted to the mandrel projecting into the die cavity, as in closed position the residual gap of the primary guide is at best equal to the residual gap of the secondary guide, however, during opening or sliding, the gap of the primary guide is always wider than the guide gap of the seondary guide.

To facilitate the fabrication of the mold, particularly with respect to preserving the residual gap, the straight-line guides of the mold parts and the guide surfaces of the inserts are first finished with respect to their taper and the inserts are inserted into the straight-line guides without any gap, whereupon the guide surfaces of the inserts, prefabricated with a sufficient overlength are cut to length according to the longitudinal displacement, which has been established by calculation, for clearing the residual gap, and joined at the mechanical stops for securing the longitudinal position determining the residual gaps. Thus, fabrication and preservation of the residual gap is not effected in a complicated way via the diameter of the guides and/or guide surfaces, but via an axial displacement of the inserts relative to the straight-line guides according to an exactly calculable axial distance, which leads to an accurate and inexpensive determination and fixing of the residual gap. Due to this calculated axial displacement for determining the residual gap, relatively high length tolerances at small taper angles remain of little significance, as they cause only minimum gap changes, with gap determination and gap fabrication as accurate as possible being preconditions for a perfect and troublefree function of the guides.

The drawing depicts the subject matter of the invention in a schematic representation.

DESCRIPTION OF THE PREFERRED EMBODIMENTS

Figure 1:
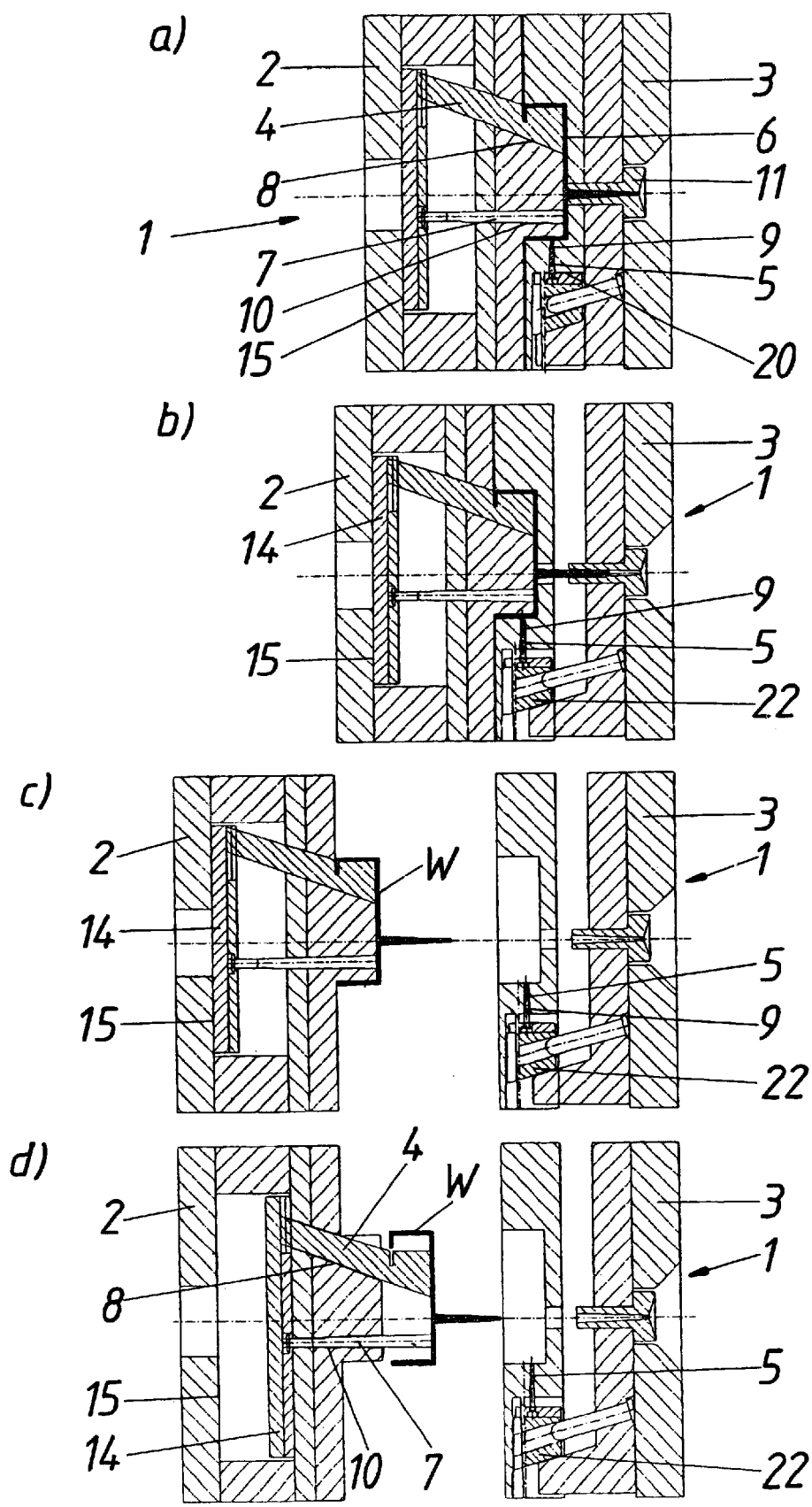
FIG. 1 shows a mold according to the invention in various operating positions, each in a section view.

As outlined in FIG. 1, a mold 1 of an injection molding or diecasting machine 1 comprises closable and openable mold parts 2, 3, which form between them a die cavity 6, a slide 4 and a 4 mandrel 5. Moreover, the mold part 2 accommodates an ejector 7, and the slide 4, the mandrel 5 and the ejector 7 are slidably inserted in the straight-line guides 8, 9, 10 of the related mold parts 2, 3. When the mold 1 is closed (FIG. 1a), via an injection tool 11, the melt can be injected into the die cavity 6, and the workpiece W can be shaped according to the die cavity 6. For opening and ejection, first the mandrel 5 is withdrawn from the die cavity 6 (FIG. 1b), then the two mold parts 2, 3 are opened (FIG. 1c), and subsequently the slide is moved out of the undercut, and the workpiece W is ejected via the ejector 7 (FIG. 1d)

To achieve functionally safe and yet long wearing guides, the straight-line guides 8, 9, 10 of the mold parts 2, 3 are designed with a taper against the guide direction narrowing in closing direction at an angle of 1° at maximum, and the guide surfaces of the related inserts run at a slant to the guide direction according to the taper.

Figure 2:
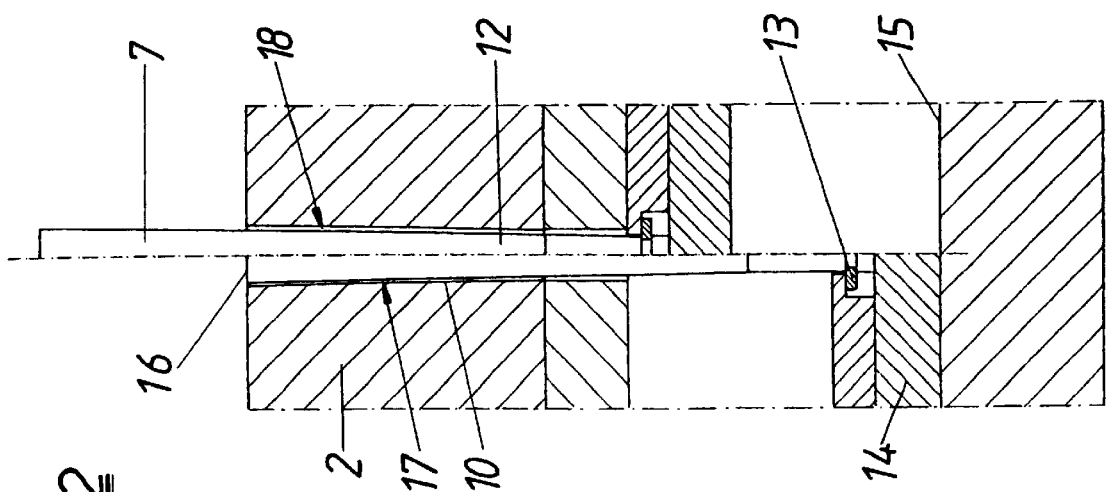
FIG. 2 shows a section of the ejector of this mold in a larger scale, with the left half depicting the closed mold, the right half depicting the open mold.
Figure 3:
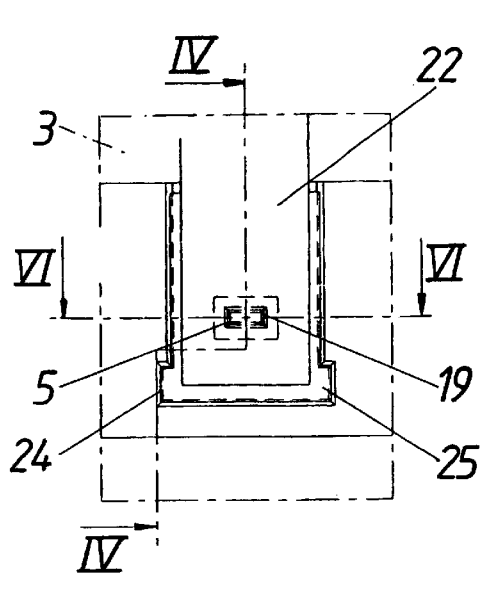
FIGS. 3, 4, 5 and 6 depict a mandrel of a mold with the related sliding device in a front view and/or in sections following line IV—IV and/or VI—VI of FIG. 3 in open and/or closed mold positions.
Figure 4:
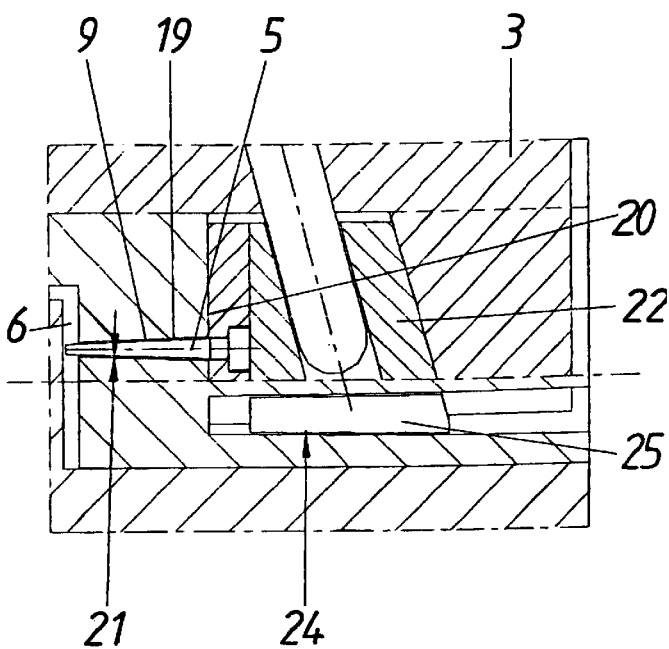
Figure 6:
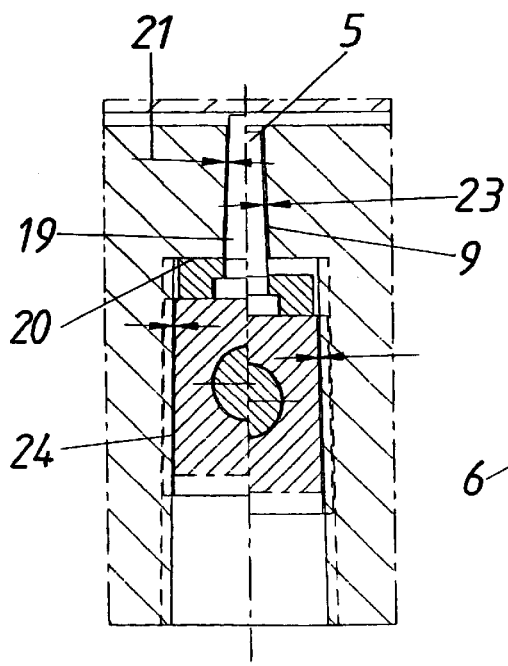
Figure 5:
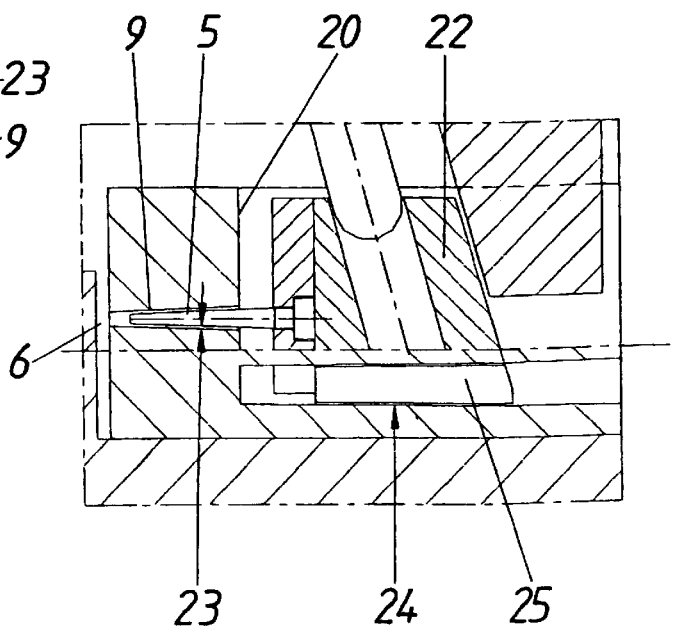

As outlined in FIG. 2, a tapered straight-line guide 10 is provided for the ejector 7 in the mold part 2, which ejector 7 is equipped with a corresponding outer taper surface 12 as guide surfaces. For sliding adjustment the ejector 7 acts upon an actuating plate 14 via a lock washer 13, with a mechanical stop 15 determining the closed position of the ejector, in which, in case of closed mold, the ejector 7 delimits the die cavity 6 with its fore-part 16 with a minimum residual gap 17 remaining between the straight-line guide 10 and the guide surface 12. Via opening the molds and/or displacing the actuating plate 14 the ejector 7 is lifted from the mechanical stop 15 and pushed into the die cavity 6 for ejecting the subject. The taper of the guide and/or the guide surfaces results in a widening guide gap 18 ensuring a smooth-running and particularly long wearing guide of the ejector 7.

As depicted in FIG. 3 to FIG. 6, a tapered guide 9 is also provided for the mandrel 5, which, due to the rectangular section of the mandrel, cooperates with a pyramid lateral area 19 as a guide surface of the mandrel 5. In this case, too, the closed position of the mandrel 5, when the mold is closed, is predetermined via a mechanical stop 20, with a minimum residual gap 21 remaining. If the mandrel 5 is withdrawn during opening the mold via an appropriate actuating device 22, the residual gap is widening immediately to a guide gap 23 ensuring a smooth-running and long wearing sliding motion.

To be able to safely take up the strains caused by the closing unit of the mold, and to avoid subjection of the mandrel 5 to these high strains, the straight-line guide 9 as a primary guide is assigned to a secondary guide 24 separated from the die cavity 6, along which the actuating unit 22 is guided displaceable with appropriate guide rails 25. This secondary guide 24, too, and the related guide surfaces of the guide rails 25 are designed with a taper. However, the taper angle of the primary guide 9 is greater than that of the secondary guide 24.

Figure 7:
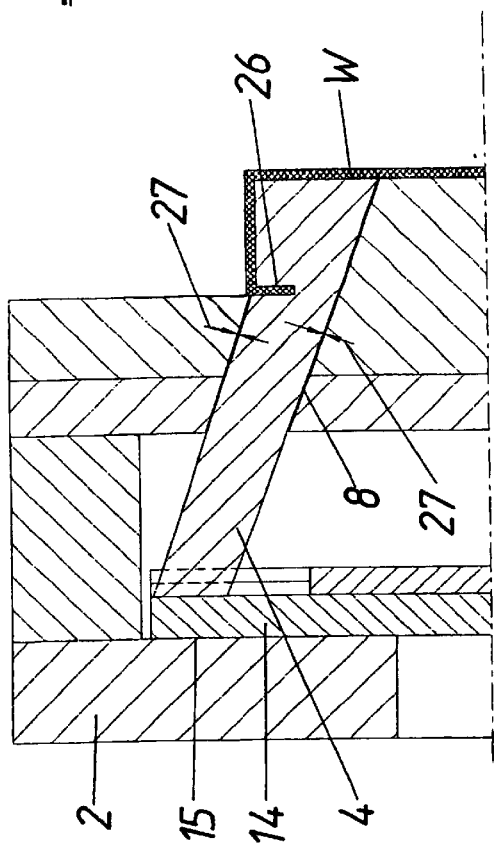
FIGS. 7 and 8 depict a section of the slide of the mold according to the invention with one closed and one open mold.
Figure 8:
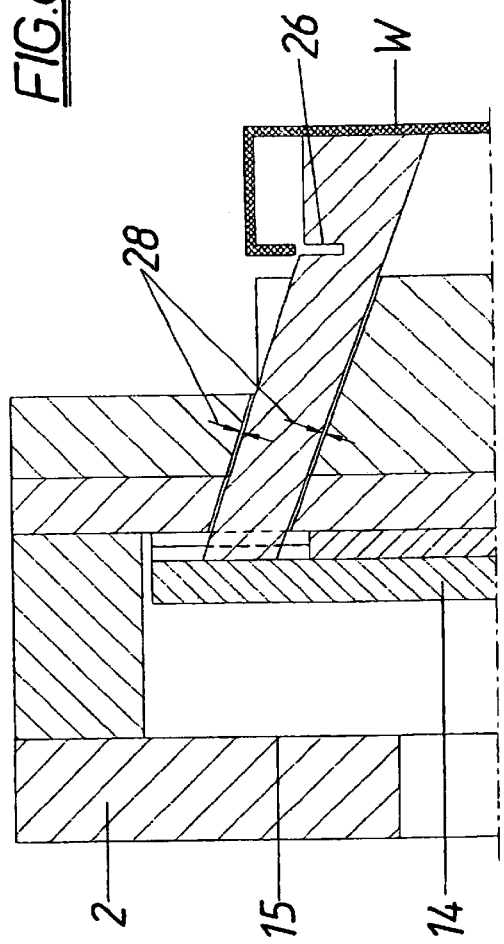

As outlined in FIG. 7 and FIG. 8, the slide 4 is displaced along a straight-line guide 8 of the mold part 2 via the actuating plate 14, to be able to mold and subsequently eject the undercut area 26 of the die cavity 6, and/or of the subject W. For the slide 4 a straight-line guide 8 with a slight taper is provided, resulting in a minimum residual gap 27 in closed position (FIG. 7) and a widened guide gap 28 during opening the mold and/or during sliding displacement of the slide in opened position. In this case, too, the mechanical stop 15 for the actuating plate 14 determines the exact closed position of the slide 4, and thus the residual gap 27.

Figure 9:
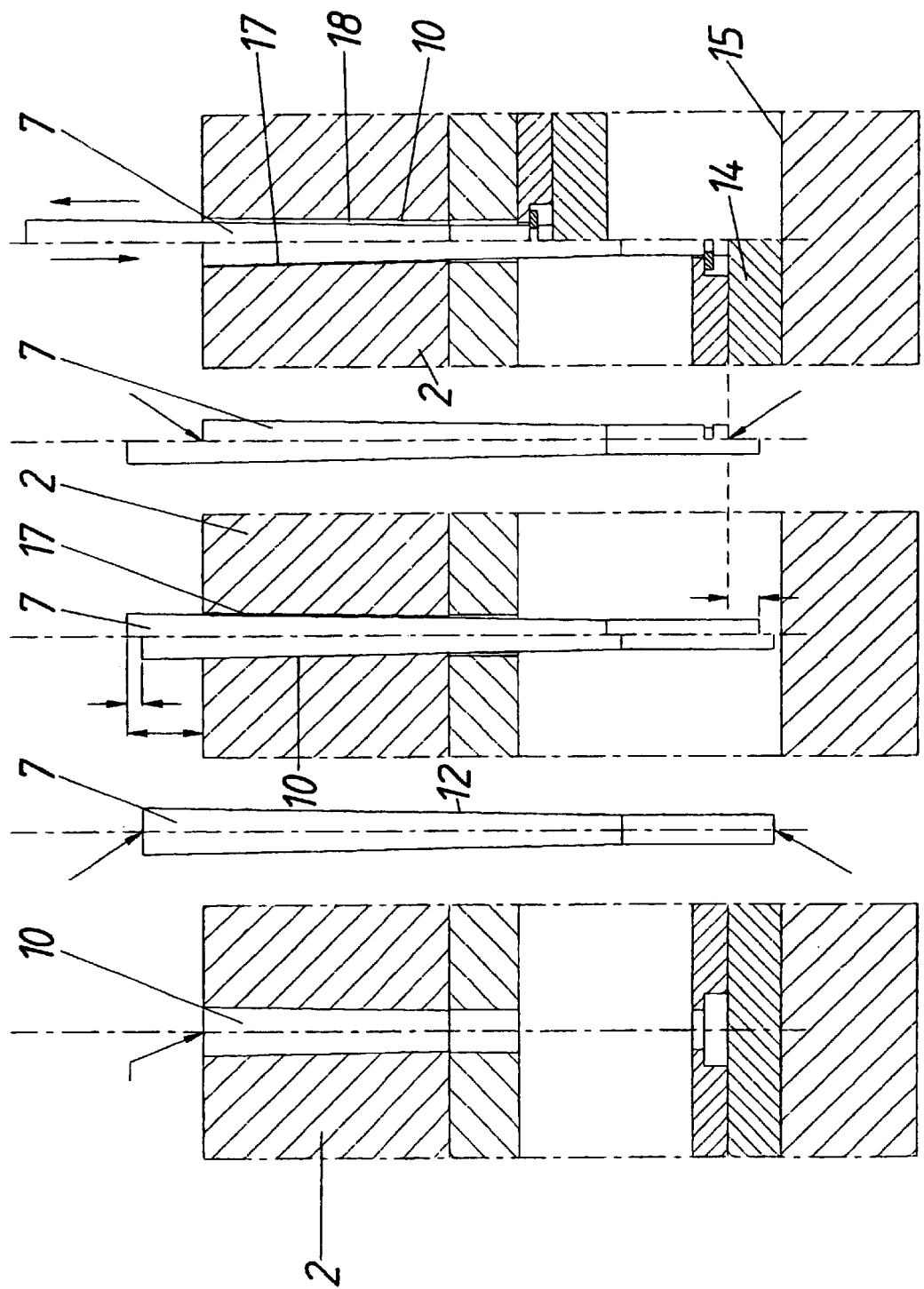
FIG. 9 shows the fabrication of the residual gap for one ejector by the example of several process steps in a section view.

As schematically outlined in FIG. 9 for the straight-line guide 10 of the ejector 7, during fabrication of the straight-line guide, for determining and adjusting the residual gap, first the straight-line guide 10 in the related mold part 2 is bored true to dimensions (FIG. 9a) and the ejector 7 is prefabricated at an appropriate over-length with a conical surface 12 corresponding to the taper of the straight-line guide 10 (FIG. 9b). Then the ejector 7 is inserted into the straight-line guide 10, until it is seated without clearance in the straight-line guide 10, and the necessary longitudinal displacement that is required for clearing of the desired residual gap 17 (FIG. 9c) is established by calculation. On the basis of this calculation, the ejector 7 is cut to the calculated dimension at the two fore-parts, and the undercut for the lock washer or similar is recessed (FIG. 9d), whereupon now the ejector 7 is properly installed in the guide and/or actuating plate 14 considering the position of the mechanical stop 15, and is subjected to an appropriate functional check (FIG. 9e). The ejector 7 is ready for operation and offers the pre-calculated residual gap 17, when the mold is closed, which results, during opening and/or displacement of the ejector, in the widened guide gap 18 due to the geometrical conditions.

What is claimed is:

1. A mold for injection molding or diecasting machines, which comprises
    (a) two closable mold parts defining a die cavity therebetween in a closed position of the mold parts, and
    (b) inserts slidably movable in rectilinear guides in respective ones of the mold parts,
        (1) the guides leading into the die cavity and having a taper narrowing in a closing direction of the mold parts, and
        (2) the inserts having guide surfaces running at a slant to the taper of the guides.

2. The mold of claim 1, wherein the taper of the guides has a maximum angle of 1°.

3. The mold of claim 1, further comprising a mechanical stop determining, in the closed position, a residual gap between the tapered guides and the guide surfaces of the inserts.

4. The mold of claim 3, wherein the residual gap has a width of 0.005 mm to 0.02 mm.

5. The mold of claim 1, wherein one of the rectilinear guides is a primary guide associated with a secondary guide separated from the die cavity, the taper of the primary guide having a greater angle than that of the secondary guide.

* * * * *